United States Patent
Porter et al.

(10) Patent No.: US 10,655,480 B2
(45) Date of Patent: May 19, 2020

(54) MINI-DISK FOR GAS TURBINE ENGINE

(71) Applicant: United Technologies Corporation, Farmington, CT (US)

(72) Inventors: Steven D. Porter, Wethersfield, CT (US); Julian Partyka, West Springfield, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1419 days.

(21) Appl. No.: 14/997,864

(22) Filed: Jan. 18, 2016

(65) Prior Publication Data
US 2020/0025210 A1    Jan. 23, 2020

(51) Int. Cl.
| | |
|---|---|
| *F01D 5/08* | (2006.01) |
| *F01D 11/00* | (2006.01) |
| *F01D 5/30* | (2006.01) |
| *F01D 5/06* | (2006.01) |

(52) U.S. Cl.
CPC ........... *F01D 5/3015* (2013.01); *F01D 5/066* (2013.01); *F01D 5/081* (2013.01); *F01D 5/082* (2013.01); *F05D 2220/32* (2013.01); *F05D 2260/33* (2013.01)

(58) Field of Classification Search
CPC ...... F01D 5/066; F01D 5/3015; F01D 11/001; F01D 5/082; F01D 5/081; F05D 2220/32; F05D 2260/33
USPC ......................................... 416/204 R, 198 A
See application file for complete search history.

(56) References Cited

U.S. PATENT DOCUMENTS

| | | | |
|---|---|---|---|
| 3,989,410 A * | 11/1976 | Ferrari ...................... | F01D 3/00 415/115 |
| 5,310,319 A | 5/1994 | Grant et al. | |
| 5,472,313 A | 12/1995 | Quinones et al. | |
| 5,816,776 A | 10/1998 | Chambon et al. | |
| 7,048,497 B2 * | 5/2006 | Arilla ...................... | F01D 5/081 415/116 |
| 7,556,474 B2 * | 7/2009 | Marchi ................... | F01D 5/081 415/115 |
| 8,387,401 B2 * | 3/2013 | Hashimoto ............. | F01D 5/081 415/115 |
| 10,030,519 B2 * | 7/2018 | Snyder .................... | F16B 39/10 |

(Continued)

FOREIGN PATENT DOCUMENTS

WO    2014150182    9/2014

OTHER PUBLICATIONS

European Search Report, European Application No. 17151853.3, dated Mar. 27, 2017, European Patent Office; European Search Report 8 pages.

*Primary Examiner* — Jason D Shanske
*Assistant Examiner* — Eric J Zamora Alvarez
(74) *Attorney, Agent, or Firm* — Cantor Colburn LLP

(57) ABSTRACT

According to one embodiment, a mini-disk of a gas turbine engine having an axis is provided. The mini-disk includes a bore, a web extending radially with respect to the axis of the gas turbine engine from the bore, a base extending axially with respect to the axis of the gas turbine engine from the bore, a connector located on an end of the base, the connector configured to connect with a hub arm of the gas turbine engine, and an expansion feature configured in the base and located between the bore and the connector, the expansion feature configured to reduce an axial stiffness of the base.

15 Claims, 5 Drawing Sheets

(56) References Cited

U.S. PATENT DOCUMENTS

2004/0247429 A1    12/2004   Arilla et al.
2016/0305248 A1*   10/2016   Sadler .................... F01D 5/082

* cited by examiner

MINI-DISK FOR GAS TURBINE ENGINE

BACKGROUND

The subject matter disclosed herein generally relates to gas turbine engines and, more particularly, to mini-disks for gas turbine engines.

Gas turbine engines include a plurality of elements, each subject to various stresses, loads, etc. Due to the operational conditions within the engines, certain components and/or parts may have shorter operational life spans than other components or parts. Accordingly, it may be advantageous to provide improved life components for gas turbine engines.

For example, a mini-disk may be a life-limiting part of a gas turbine engine. In some configurations, a mini-disk may be positioned between a turbine disk and a supply of hot gases. Further, the mini-disk may be located at a position radially within the gas turbine engine that is self-supporting. Thus, the mini-disk may be subject to high loads and/or stresses, e.g., thermal stresses. Due to high thermal loads and/or high loads due to the rotation of the components of the engine, the mini-disk may suffer failure prior to other components of the gas turbine engine. Accordingly, an improved life mini-disk is desirable.

SUMMARY

According to one embodiment, a mini-disk of a gas turbine engine having an axis is provided. The mini-disk includes a bore, a web extending radially with respect to the axis of the gas turbine engine from the bore, a base extending axially with respect to the axis of the gas turbine engine from the bore, a connector located on an end of the base, the connector configured to connect with a hub arm of the gas turbine engine, and an expansion feature configured in the base and located between the bore and the connector, the expansion feature configured to reduce an axial stiffness of the base.

In addition to one or more of the features described above, or as an alternative, further embodiments of the mini-disk may include that the expansion feature comprises at least one convolution.

In addition to one or more of the features described above, or as an alternative, further embodiments of the mini-disk may include that the at least one convolution comprises an omega shape.

In addition to one or more of the features described above, or as an alternative, further embodiments of the mini-disk may include that the connector is configured to attach to the hub arm between a hub first part and a hub second part of a turbine disk.

In addition to one or more of the features described above, or as an alternative, further embodiments of the mini-disk may include that the bore comprises a radial load feature configured to transfer a radial load from the bore into a turbine disk.

In addition to one or more of the features described above, or as an alternative, further embodiments of the mini-disk may include that the radial load feature comprises a bumper formed in the bore.

In addition to one or more of the features described above, or as an alternative, further embodiments of the mini-disk may include a web tip located at an end of the web, the web tip configured to engage with an attachment of a turbine disk of the gas turbine engine.

According to another embodiment, a gas turbine engine is provided. The gas turbine engine includes a turbine disk and a mini-disk. The mini-disk includes a bore, a web extending radially with respect to the axis of the gas turbine engine from the bore, a base extending axially with respect to the axis of the gas turbine engine from the bore, a connector located on an end of the base, the connector configured to connect with a hub arm of the gas turbine engine, and an expansion feature configured in the base and located between the bore and the connector, the expansion feature configured to reduce an axial stiffness of the base.

In addition to one or more of the features described above, or as an alternative, further embodiments of the gas turbine engine may include that the expansion feature comprises at least one convolution.

In addition to one or more of the features described above, or as an alternative, further embodiments of the gas turbine engine may include that the at least one convolution comprises an omega shape.

In addition to one or more of the features described above, or as an alternative, further embodiments of the gas turbine engine may include that the connector is configured to attach to the hub arm between a hub first part and a hub second part of a turbine disk.

In addition to one or more of the features described above, or as an alternative, further embodiments of the gas turbine engine may include that the bore comprises a radial load feature configured to transfer a radial load from the bore into a turbine disk.

In addition to one or more of the features described above, or as an alternative, further embodiments of the gas turbine engine may include that the radial load feature comprises a bumper formed in the bore.

In addition to one or more of the features described above, or as an alternative, further embodiments of the gas turbine engine may include a web tip located at an end of the web, the web tip configured to engage with an attachment of a turbine disk of the gas turbine engine.

In addition to one or more of the features described above, or as an alternative, further embodiments of the gas turbine engine may include that the turbine disk comprises a bumper, the bumper of the turbine disk configured to receive a radial load from the bore.

In addition to one or more of the features described above, or as an alternative, further embodiments of the gas turbine engine may include that the turbine disk comprises a hub arm, the hub arm having a first part and a second part, and the connector of the mini-disk is engaged between the first part and the second part of the turbine disk.

In addition to one or more of the features described above, or as an alternative, further embodiments of the gas turbine engine may include a fastener configured to attach the first part, the connector, and the second part.

According to another embodiment, a method of manufacturing a mini-disk for a gas turbine engine is provided. The method includes forming a bore, forming a web extending radially from the bore, forming a base extending axially from the bore, forming a connector located on an end of the base, the connector configured to connect with a hub arm of the gas turbine engine, and forming an expansion feature in the base and located between the bore and the connector, the expansion feature configured to reduce an axial stiffness of the base.

In addition to one or more of the features described above, or as an alternative, further embodiments of the method may include forming a radial load feature in the bore, the radial load feature configured to engage with a portion of a turbine disk.

In addition to one or more of the features described above, or as an alternative, further embodiments of the method may include that the expansion feature comprises at least one convolution.

Technical effects of embodiments of the present disclosure include a mini-disk for a gas turbine engine having improved life. Further technical effects include a mini-disk for a gas turbine engine having an expansion feature. Further technical effects include a mini-disk for a gas turbine engine having a radial load feature.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
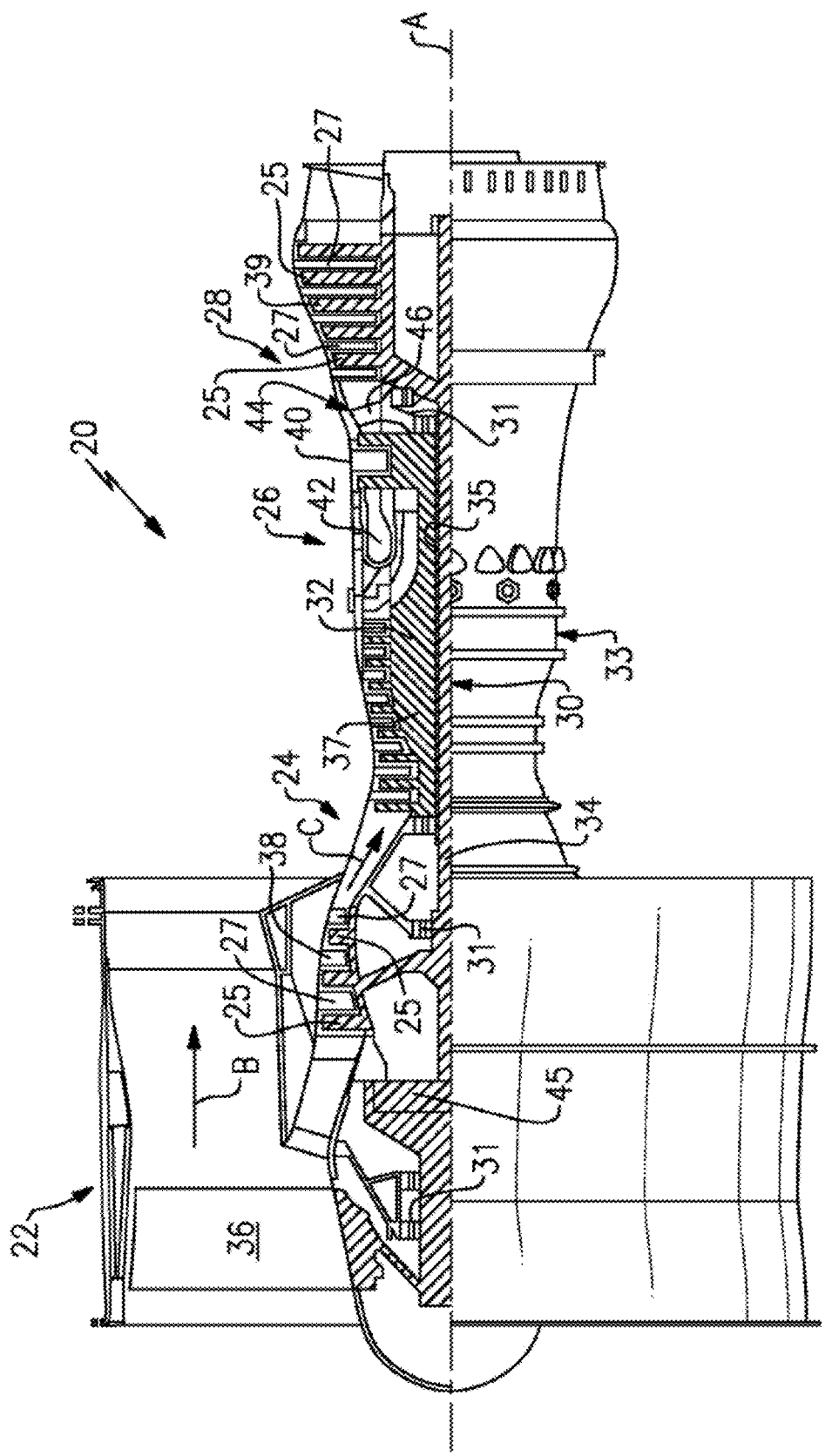
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram \,°\, R)/(518.7° R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
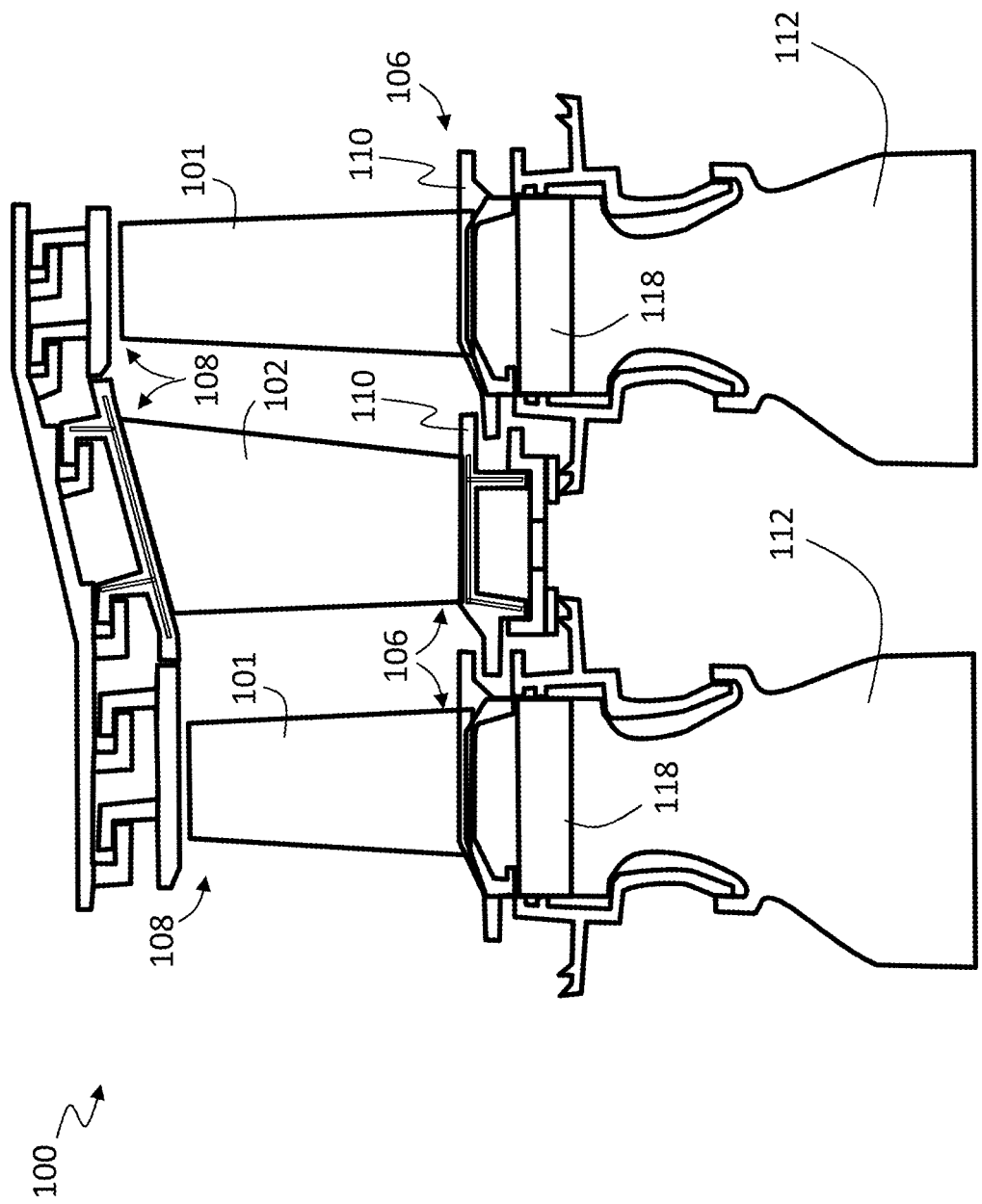
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110. The platform 110 may be mounted to an attachment 118 of a turbine disk 112.

Figure 2:
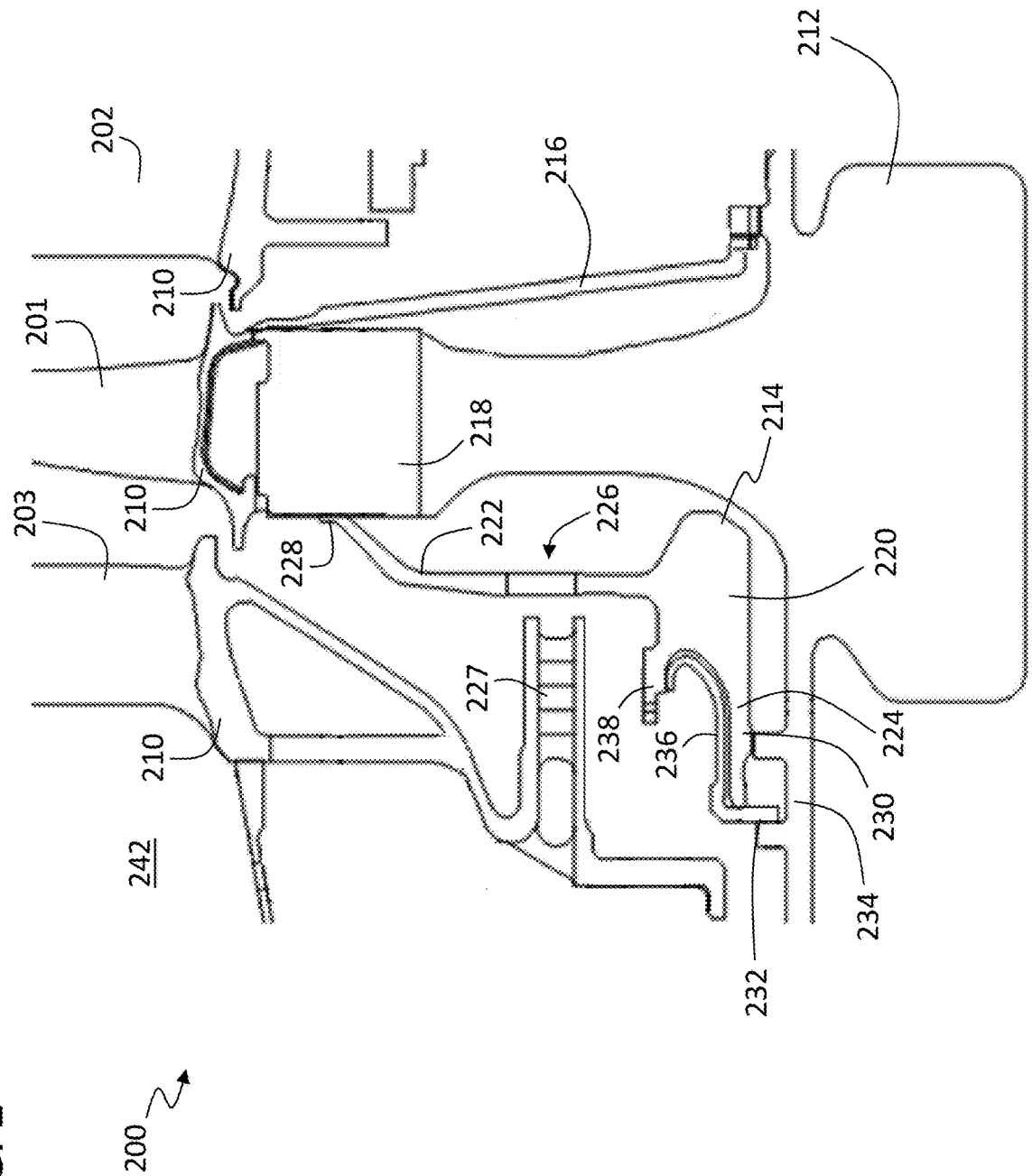
FIG. 2 is a schematic illustration of a portion of a turbine showing a mini-disk configuration.

Turning now to FIG. 2, an enlarged detailed schematic illustration of a turbine 200 is shown. As shown in FIG. 2, an inlet guide airfoil 203 is configured downstream from a combustor 242. Inlet guide airfoil 203, in some engine configurations, comprises a vane that is suspended from a turbine case at its outer diameter end. An airfoil 201 extends from a platform 210 that is coupled to a turbine disk 212. The turbine disk 212 may be a first stage rotor disk of the turbine 200.

As shown, the turbine disk 212 includes a forward mini-disk 214 and an aft seal plate 216. The forward mini-disk 214 may be configured to seal against an attachment 218 of the disk 212, and further may be configured to direct cooling air (not shown) into a rim slot of the attachment 218. Aft seal plate 216 may be configured to prevent escape of the cooling air into a cavity downstream of the turbine disk 212.

Hot combustion gases may be generated within combustor 242 upstream of the turbine 200 and flow through a gas path that is located and defined between axially adjacent airfoils and portions of the turbine 200. For example, inlet guide airfoil 203 may turn a flow air to improve incidence on the next airfoil 201 of the 200. As such, the airfoil 201 may be able to extract energy from the air efficiently. Likewise, a subsequent airfoil 202 may turn the flow of the air from the airfoil 201 to improve incidence on a subsequent airfoil (not shown). The air flow may impact the airfoils 201 to cause rotation of associated turbine disks 212 and rotor disk (not shown) about the engine centerline longitudinal axis (e.g., axis A of FIG. 1A). Cooling air may be routed from a high pressure compressor to the turbine 200, e.g., so that cool air can enter internal cooling channels of the airfoils 201, 202, 203 without having to pass through any non-rotating components when turbine 200 is operating.

The mini-disk 214 may include a bore 220, a web 222 extending radially from the bore 220, and a base 224 extending axially from the bore 220. The web 222 may include an aperture 226 that enables air flowing through a tangential on-board injector 227 to pass through the web 222. The web 222 further includes a web tip 228 at an end of the web 222. The web tip 228 may be configured to form a seal or fit with the attachment 218. For example, the web tip 228 may engage in an interference or snap fit with a surface of the attachment 218.

The base 224 of the mini-disk 214 may include a first connector 230 and a second connector 232. The first and second connectors 230, 232 may be configured to connect to a hub arm 234 of the turbine disk 212. In some embodiment, as shown, an optional heat shield 236 may be positioned about the base 224 and the bore 220 and fit to a balance flange 238 of the mini-disk 214.

The mini-disk may be subject to high stresses and/or temperatures. It may be advantageous to transfer loads into the turbine disk, to thus reduce stresses on the mini-disk, and thus increase the life of the mini-disk. Accordingly, embodiments as provided herein enable a mechanism for reducing loads on the mini-disk and/or enable transference of loads from the mini-disk to the turbine disk.

Figure 3:
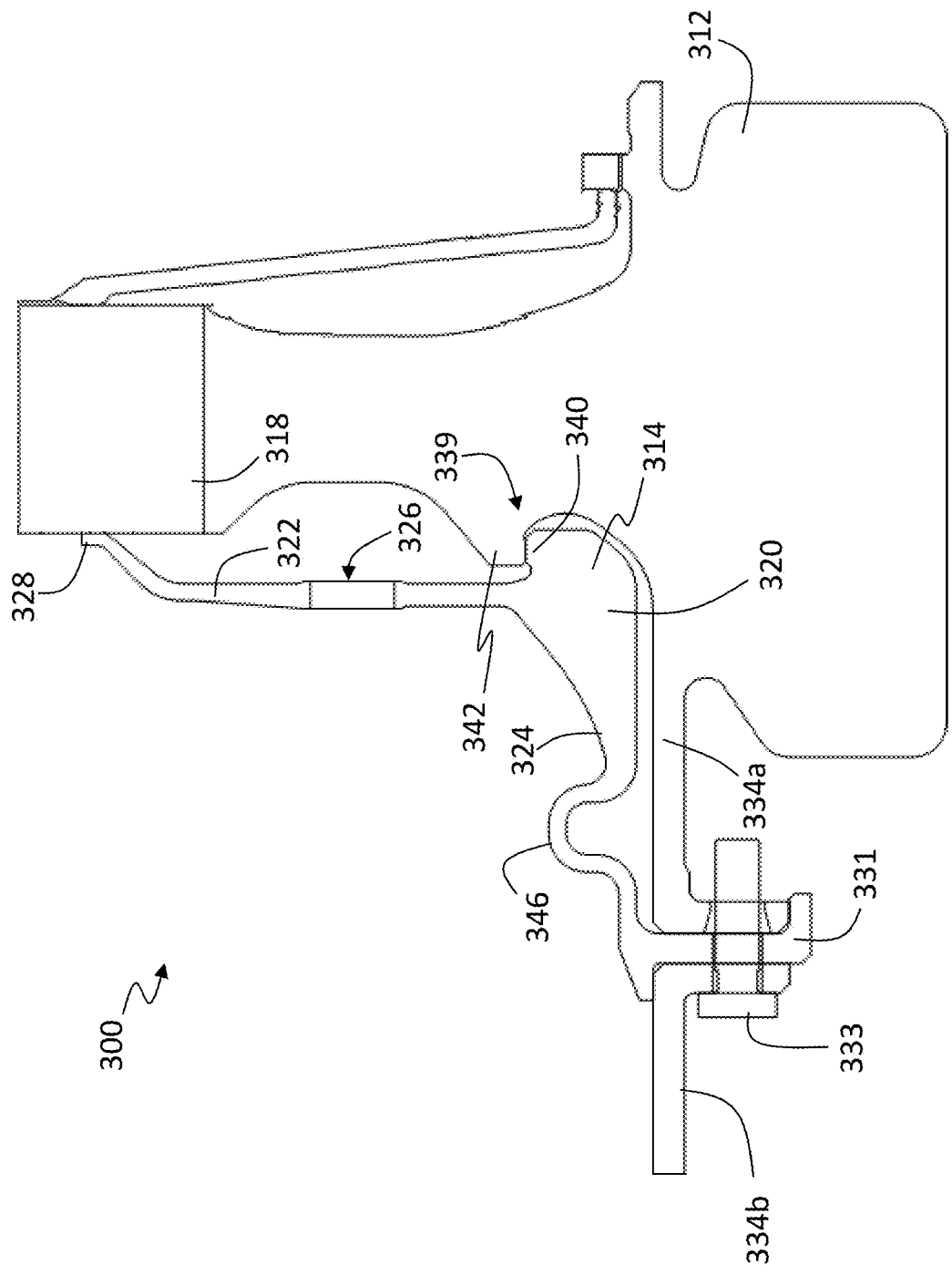
FIG. 3 is a schematic illustration of a turbine having a mini-disk configuration in accordance with an embodiment of the present disclosure.

Turning now to FIG. 3, a schematic illustration of a turbine 300 in accordance with a non-limiting embodiment of the present disclosure is shown. As shown, the turbine 300 includes a turbine disk 312 and a mini-disk 314. The turbine disk may include a hub arm 334a, 334b extending axially and an attachment 318 extending radially. As shown, the hub arm 334a, 334b may be constructed in two parts, with a first part 334a directly connected to and/or part of the turbine disk 312 and a second part 334b attached to the first part 334a by a fastener 333. The second part 334b may be part of a shaft or stub shaft of the turbine 300.

Similar to the configuration shown in FIG. 2, the mini-disk 314 includes a bore 320, a web 322, and a base 324. The web 322 includes an aperture 326 similar to the above described configuration that enables air to flow through the web 322. The web 322 further includes a web tip 328 that may engage with the attachment 318 of the turbine disk 312. The base 324 may include a connector 331 that may be fixedly connected to the hub arm 334a, 334b between the first part 334a and the second part 334b by the fastener 333.

In addition to the connections and engagements at the web tip 328 and the connector 331, the mini-disk 314 may further interact or engage with the turbine disk 312 at the bore 320 of the mini-disk 314. A radial load feature 339 may be configured to enable engagement and load transference between the bore 320 of the mini-disk 314 and the turbine disk 312.

For example, as shown, the bore 320 may include a bore bumper 340. A corresponding disk bumper 342 may be configured on the turbine disk 312. The bore bumper 340 and the disk bumper 342 may engage or contact each other at a bumper contact surface. The engagement of the bore bumper 340 to the disk bumper 342 may enable the transference of radial loads from the bore 320 into the turbine disk 312, thus reducing the radial loads experienced by the mini-disk 314.

In alternative embodiments, the radial load feature 339 between the bore and the turbine disk may be achieved with different configurations. For example, in some embodiments, a tab/slot arrangement may be provided between the bore of the mini-disk and the turbine disk. Further, in other embodiments, a flange arrangement may be used. Accordingly, various configurations may be used without departing from the scope of the present disclosure.

Further, as shown, the mini-disk 314 may include an expansion feature 346 along the base 324 of the mini-disk 314. The expansion feature 346 may be a feature of the base 324 located between the bore 320 and the connector 331. The expansion feature 346 may be a convolution or other structure that enables the base 324 and the material thereof to thermally expand axially without fatiguing the connection between the mini-disk 314 and the turbine disk 312. Further, as the mini-disk 314 expands axially due to thermal influences, a radial load may be transferred into the turbine disk 312 when friction engagement is achieved between the bore bumper 340 and the disk bumper 342.

As shown in FIG. 3, the expansion feature 346 has an omega convolution configuration. However, those of skill in the art will appreciate that other geometries and/or configurations are possible without departing from the scope of the present disclosure. For example, a curved surface, an angled surface, or other surface geometries of the expansion feature are possible without departing from the scope of the present disclosure.

Figure 4A:
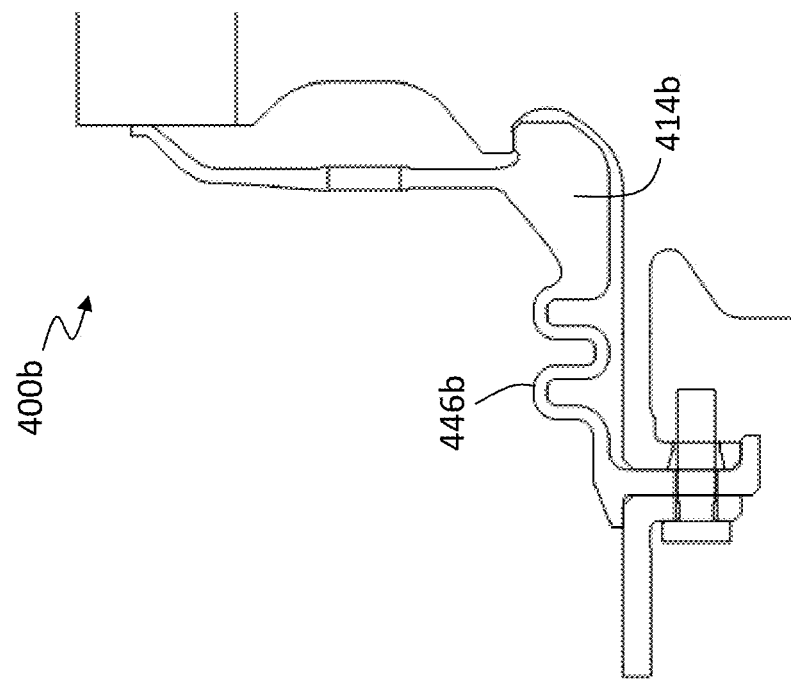
FIG. 4A is a schematic illustration of an alternative configuration of an expansion feature in accordance with an embodiment of the present disclosure.
Figure 4B:
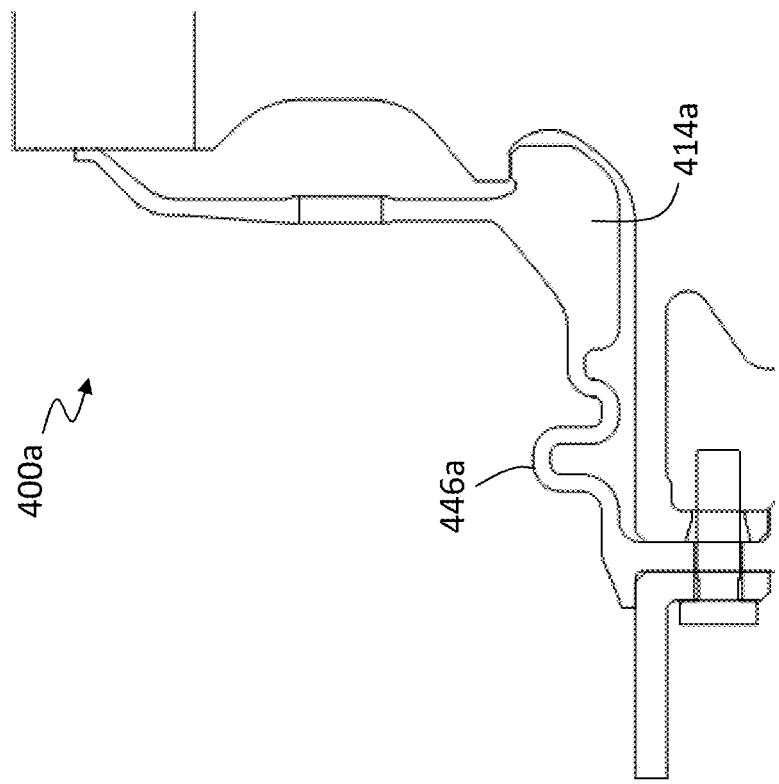
FIG. 4B is a schematic illustration of another alternative configuration of an expansion feature in accordance with an embodiment of the present disclosure.

Turning to FIGS. 4A and 4B, alternative configurations of an expansion feature in accordance with the present disclosure is shown. The turbines 400a, 400b may be substantially similar to that described above and thus similar features will not be described again.

However, as shown, the expansion features 446a, 446b of the mini-disks 414a, 414b, respectively, have different configurations than that described above. As shown in FIG. 4A, the expansion feature 446a includes a one-and-a-half omega convolution. The expansion feature 446b of FIG. 4B includes a double omega convolution.

In each of the above embodiments, or other configurations as enabled herein, provide for reduced axial stiffness of the base of the mini-disk, and thus a higher thermal stress may be tolerated by the mini-disk. The mini-disk 314 of FIG. 3, for example, may be about nine times less axially stiff than a mini-disk not including the expansion feature 346 (e.g., mini-disk 214 of FIG. 2). The amount of axial stiffness may be further reduced or adjusted by employing different geometries. For example, the expansion feature 446a of FIG. 4A may provide a thirteen times axial stiffness reduction in the mini-disk, and the expansion feature 446b of FIG. 4B may provide a twenty-four times axial stiffness reduction in the mini-disk. As will be appreciated by those of skill in the art, a certain amount of axial stiffness may be required to enable proper load bearing and structural rigidity in a gas turbine engine, and thus merely adding more convolutions (or other geometry) may not be desired. Accordingly, those of skill in the art will appreciate that a desired stiffness reduction may be achieved by configuration the geometry of the expansion feature while maintaining other structural requirements for the mini-disk.

In one non-limiting example, a mini-disk configured without the features (e.g., expansion feature and/or radial load feature) as provided herein may be subject to about 70,000 lbs. of load transfer from the mini-disk into a high spool stack. However, with the features incorporated as described herein, the load transfer may be reduced to about 7,000 lbs. of load transfer. Such reduced transfer loads may enable the use of a fastener to fix the mini-disk to the turbine disk, without having the fastener be overloaded.

Advantageously, embodiments described herein provide a mini-disk for a gas turbine engine that may enable load transfer into a turbine disk, thus improving the life of the mini-disk. For example, a radial load feature may be included to impart load into the turbine disk from the mini-disk. This may, advantageously, account for a bore mass that is located at a high radius relative to a gas turbine engine central axis. Further, an expansion feature may be configured with the mini-disk such that axial stiffness may be reduced to account for thermal expansion and relative movement between elements or parts of the mini-disk and the turbine disk.

Further, advantageously, expansion features as provided herein may prevent radial load from transferring into the turbine disk or other elements of the gas turbine engine. For example, axial and radial loads may not be transferred into a stack load holding a high pressure compressor and high pressure turbine together. Further, advantageously, expansion features as provided herein may enable five or more times reduction in axial stiffness of the mini-disk such that a connector of the mini-disk can be packaged and contain radial and axial loads created by mini-disk to turbine disk thermal flight.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although an aero or aircraft engine application is shown and described above, those of skill in the art will appreciate that turbine disk configurations as described herein may be applied to industrial applications and/or industrial gas turbine engines, land based or otherwise.

Further, although described and shown with various example geometries and configurations of both the radial load feature and the expansion feature, those of skill in the art will appreciate that variations on the disclosed shapes, geometries, etc. may be made without departing from the scope of the present disclosure.

Accordingly, the present disclosure is not to be seen as limited by the foregoing description, but is only limited by the scope of the appended claims.

What is claimed is:

1. A mini-disk of a gas turbine engine having an axis comprising:
   a bore having a radial load feature configured to transfer a radial load from the bore into a turbine disk of the gas turbine engine;
   a web extending radially with respect to the axis of the gas turbine engine from the bore;
   a base extending axially with respect to the axis of the gas turbine engine from the bore;
   a connector located on an end of the base, the connector configured to connect with a hub arm of the gas turbine engine;
   an expansion feature configured in the base and located between the bore and the connector, the expansion feature configured to reduce an axial stiffness of the base; and
   a web tip located at an end of the web, the web tip configured to engage with an attachment of the turbine disk of the gas turbine engine.

2. The mini-disk of claim 1, wherein the expansion feature comprises at least one convolution.

3. The mini-disk of claim 2, wherein the at least one convolution comprises an omega shape.

4. The mini-disk of claim 1, wherein the connector is configured to attach to the hub arm between a hub first part and a hub second part of the turbine disk.

5. The mini-disk of claim 1, wherein the radial load feature comprises a bumper formed in the bore.

6. A gas turbine engine comprising:
   a turbine disk; and
   a mini-disk, the mini-disk comprising:
     a bore having a radial load feature configured to transfer a radial load from the bore into the turbine disk of the gas turbine engine;
     a web extending radially with respect to the axis of the gas turbine engine from the bore;
     a base extending axially with respect to the axis of the gas turbine engine from the bore;
     a connector located on an end of the base, the connector configured to connect with a hub arm of the gas turbine engine;
     an expansion feature configured in the base and located between the bore and the connector, the expansion feature configured to reduce an axial stiffness of the base; and
     a web tip located at an end of the web, the web tip configured to engage with an attachment of the turbine disk of the gas turbine engine.

7. The gas turbine engine of claim 6, wherein the expansion feature comprises at least one convolution.

8. The gas turbine engine of claim 7, wherein the at least one convolution comprises an omega shape.

9. The gas turbine engine of claim 8, wherein the connector is configured to attach to the hub arm between a hub first part and a hub second part of the turbine disk.

10. The gas turbine engine of claim 6 wherein the radial load feature comprises a bumper formed in the bore.

11. The gas turbine engine of claim 6, wherein the turbine disk comprises a bumper, the bumper of the turbine disk configured to receive a radial load from the bore.

12. The gas turbine engine of claim 6, wherein the turbine disk comprises a hub arm, the hub arm having a first part and a second part, and the connector of the mini-disk is engaged between the first part and the second part of the turbine disk.

13. The gas turbine engine of claim 12, further comprising a fastener configured to attach the first part, the connector, and the second part.

14. A method of manufacturing a mini-disk for a gas turbine engine, the method comprising:
   forming a bore having a radial load feature configured to transfer a radial load from the bore into a turbine disk of the gas turbine engine;
   forming a web extending radially from the bore, with a web tip located at an end of the web, the web tip configured to engage with an attachment of the turbine disk of the gas turbine engine;
   forming a base extending axially from the bore;
   forming a connector located on an end of the base, the connector configured to connect with a hub arm of the gas turbine engine; and
   forming an expansion feature in the base and located between the bore and the connector, the expansion feature configured to reduce an axial stiffness of the base.

15. The method of claim 14, wherein the expansion feature comprises at least one convolution.

* * * * *